United States Patent [19]

Fazion

[11] Patent Number: 5,222,858
[45] Date of Patent: Jun. 29, 1993

[54] APPARATUS FOR COLLECTING COUNTING AND STACKING MATERIAL IN SHEETS

[75] Inventor: Doriano Fazion, Casaleone, Italy

[73] Assignee: Dowen Company Limited, Douglas, Isle of Man

[21] Appl. No.: 764,541

[22] Filed: Sep. 24, 1991

[51] Int. Cl.⁵ .............................................. B65H 31/30
[52] U.S. Cl. ................................... 414/790.3; 271/5; 271/13; 271/107; 271/207; 271/251
[58] Field of Search ............... 414/789.9, 790.3, 794.7, 414/901; 271/5, 12, 13, 15, 107, 194, 207, 250, 251

[56] References Cited

U.S. PATENT DOCUMENTS

| | | |
|---|---|---|
| 2,145,764 | 1/1939 | Goebel et al. |
| 3,061,066 | 10/1962 | Casino ............................ 414/901 |
| 3,297,174 | 1/1967 | Letchworth ..................... 414/790.3 |
| 3,466,028 | 9/1969 | Bays ................................ 271/11 |
| 3,730,513 | 5/1973 | Colombini ....................... 271/12 |
| 4,179,865 | 12/1979 | Pellaton . |
| 4,538,801 | 9/1985 | Van Pelt . |
| 4,543,864 | 10/1985 | Hochanadel et al. |
| 4,834,606 | 5/1989 | Burns et al. |

FOREIGN PATENT DOCUMENTS

| | | |
|---|---|---|
| 35686 | 1/1965 | German Democratic Rep. ................................ 414/794.7 |
| 1102788 | 12/1965 | United Kingdom . |

Primary Examiner—H. Grant Skaggs
Attorney, Agent, or Firm—Testa, Hurwitz & Thibeault

[57] ABSTRACT

The apparatus for collecting, counting and stacking material in sheets has two cascade conveyors, a loading device arranged upstream of the first conveyor, a counting station arranged downstream of the second conveyor, and a station for stacking a material in sheets or in modular pieces which have already been counted in the counting station.

15 Claims, 3 Drawing Sheets

APPARATUS FOR COLLECTING COUNTING AND STACKING MATERIAL IN SHEETS

BACKGROUND OF THE INVENTION

The present invention relates to an apparatus for collecting, counting and stacking material in sheets, particularly but not exclusively useful in the field of the food industry.

As known, in the industrial production of food products in sheet form, such as for example lasagne and pasta in thin layers in general, the unloading, counting and stacking operations have so far been performed manually, in particular due to the fragility of the material to be handled.

This entails necessarily long execution times, with negative consequences on productivity and production costs.

SUMMARY OF THE INVENTION

The aim of the present invention is to provide an apparatus which is capable of performing the operations for unloading, counting and stacking material in sheets or in modular pieces in an automatic manner, in extremely short times, compatible with the times of the cycle of automatic production of the material to be handled and thus with a very high productivity.

Not least object of the present invention is to allow maximum hygiene in the packaging of materials in sheets or in modular pieces, which are constantly kept away from sources of contamination.

This aim, these objects and others which will become apparent hereinafter are achieved by an apparatus for collecting, counting and stacking material in sheets or in modular pieces which comprises a fixed supporting framework, a carriage or slider which is slidingly mounted on the fixed framework with the possibility of an alternating back-and-forth motion between a loading position and an unloading position, a cross-member which is pivoted to said carriage and is provided with grip means, means for actuating said cross-member so as to make it oscillate about its own pivoting axis transversely to the direction of motion of the carriage between a lowered position for the engagement of a plurality of sheets or modular pieces and a raised position for the transfer thereof, a belt or wire conveyor which is arranged at the unloading position of the carriage or slider and is intended to remove the sheets or pieces unloaded by the grip means, and a conveyance-orientation unit which is arranged after the conveyor and is suitable for simultaneously receiving a plurality of sheets or pieces fed by the conveyor and for orientating them during conveyance, a plurality of counting compartments arranged after the conveyance-orientation unit, each counting compartment being provided with counting means, a stacking compartment arranged after each counting compartment, first transfer means, suitable for transferring individual sheets or pieces from the respective counting compartment to the stacking compartment, and second transfer means intended to transfer stacked sheets or pieces from each stacking compartment to an output.

BRIEF DESCRIPTION OF THE DRAWINGS

Further characteristics and advantages of the apparatus according to the invention will become apparent from the description of a preferred but not exclusive embodiment thereof, given by way of non-limitative example with reference to the accompanying drawings, wherein.

In the various figures of the drawing, identical or similar parts or components have been indicated with the same reference numerals.

DESCRIPTION OF THE PREFERRED EMBODIMENTS

Figure 1:
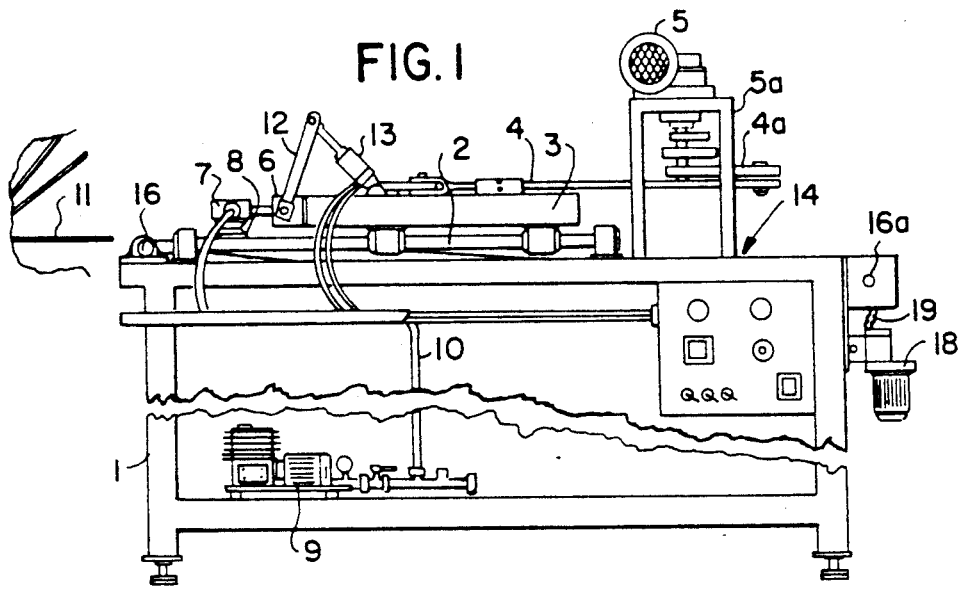
FIG. 1 is a schematic lateral elevation view of a first portion of the apparatus according to the invention.
Figure 2:
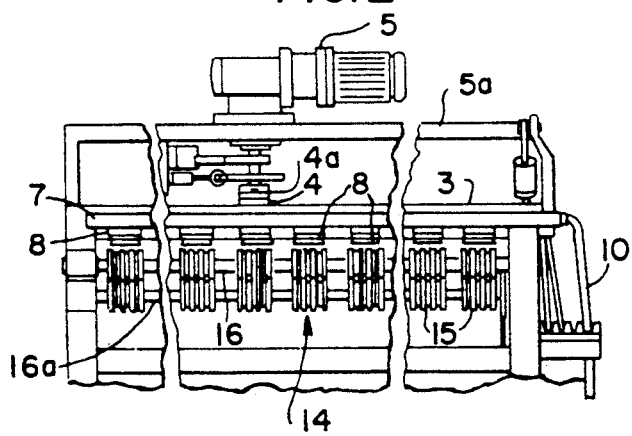
FIG. 2 is a front elevation view, taken from the left side of FIG. 1.
Figure 7:
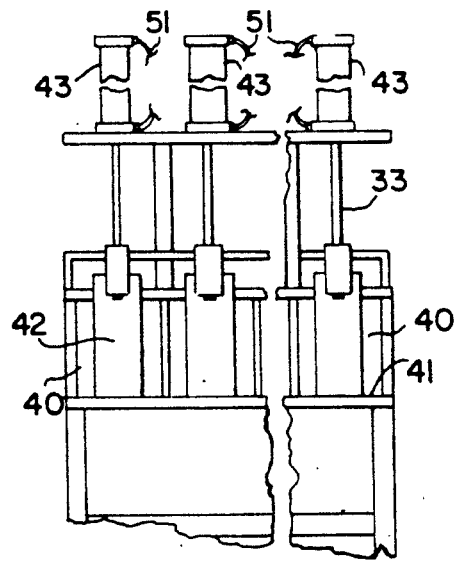
FIG. 7 is front elevation view, taken from the right side of FIG. 4.
Figure 8:
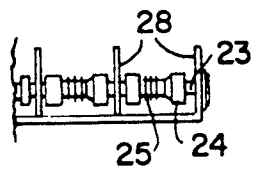
FIG. 8 is a view of a detail of FIG. 5.
Figure 3:
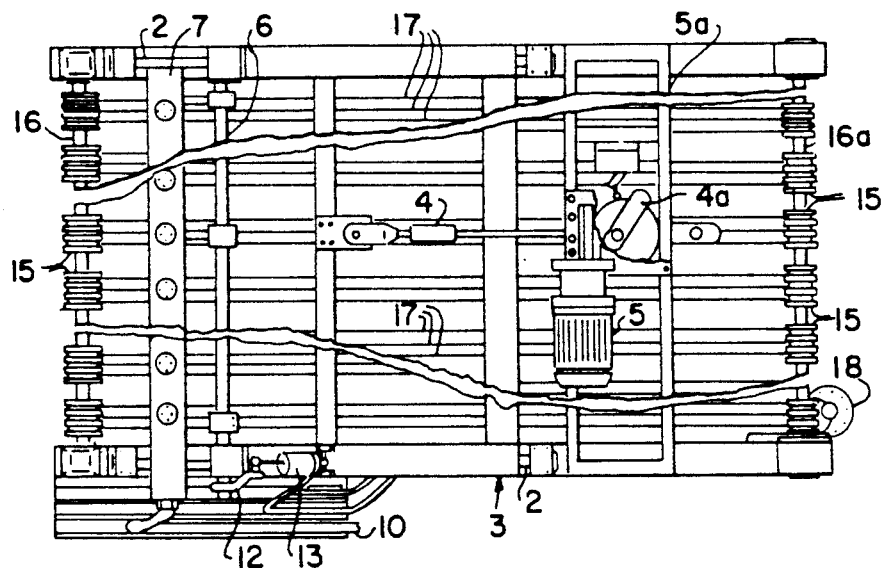
FIG. 3 is a schematic plan view of FIG. 1.
Figure 9:
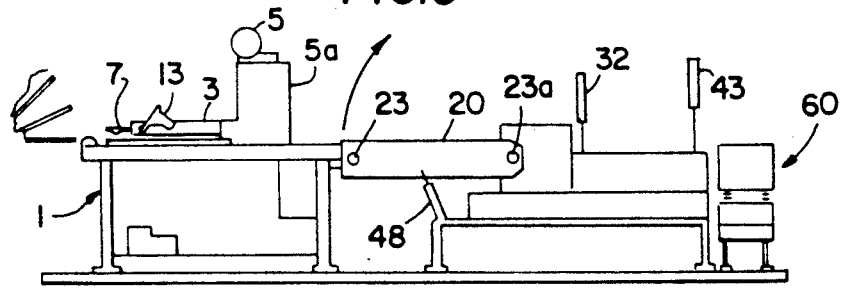
FIG. 9 is a schematic lateral elevation view of the entire apparatus according to the invention.
Figure 6:
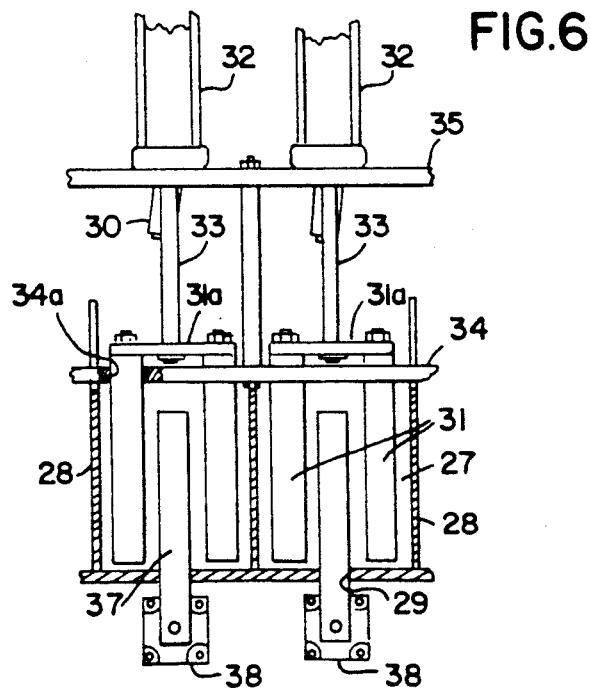
FIG. 6 is a sectional view, taken along the line VI—VI of FIG. 5.
Figure 4:
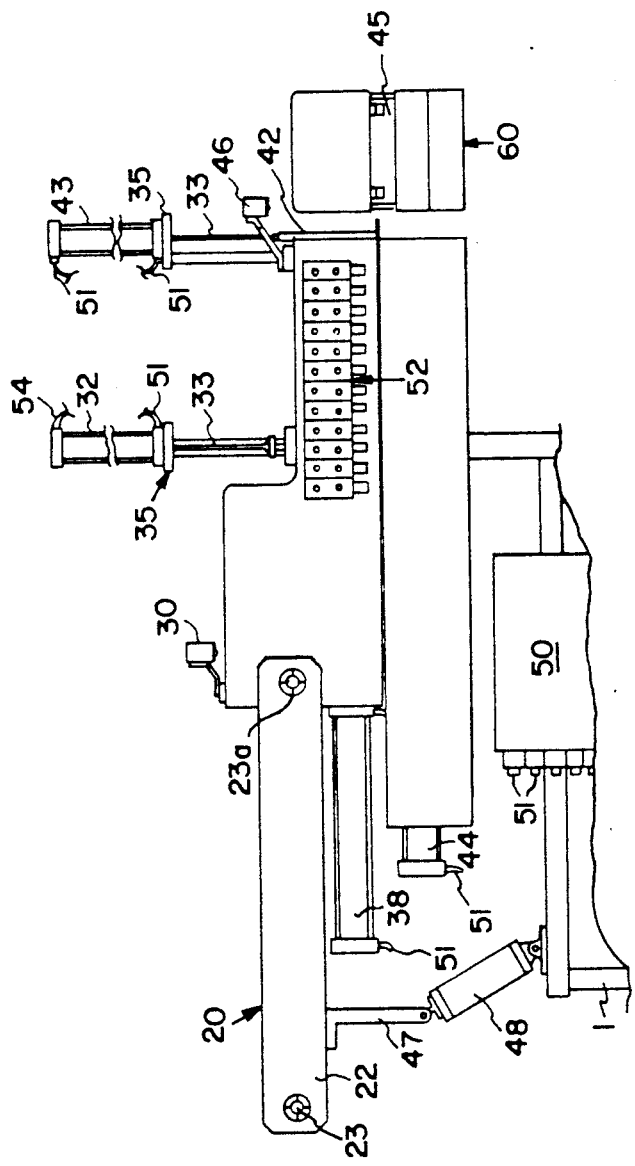
FIG. 4 is a schematic side elevation view of a second portion of the apparatus according to the invention.
Figure 5:
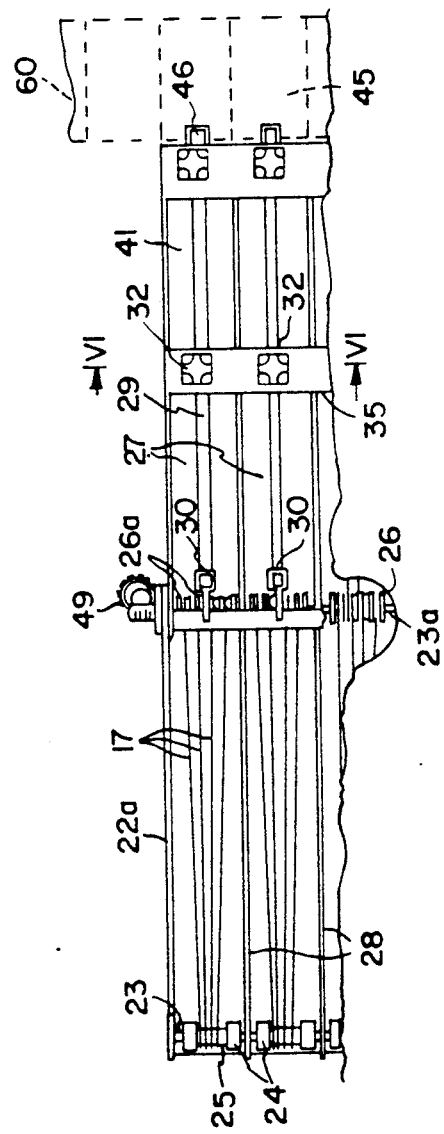
FIG. 5 is a plan view of FIG. 4.

With reference to the above figures, the apparatus according to the present invention comprises a first portion which has a fixed framework 1 which is formed for example by steel tubular profiled elements.

Two fixed longitudinal lateral guides 2 are supported on the framework 1, and a slider 3 is slidingly mounted thereon; said slider is actuated by a unit with a connecting rod 4 and a crank 4a which is kinematically connected to a gearmotor 5 which is supported by a frame 5a.

A cross-member 6 is pivoted to the slider, extends in a bridge-like manner perpendicular to the guides 2 and supports, in a cantilever manner, a manifold 7 which is provided with a plurality of sucker-fitted intake ports 8 and is connected to a suction pump 9, for example by means of a flexible hose 10.

Each of the intake ports 8 is intended to engage, by virtue of the negative pressure created by the pump 9, a sheet, particularly a lasagna sheet, which is carried on an open tray 11 in output from a drying oven (not illustrated in the figures, for example such as the one illustrated and disclosed in the U.S. patent application Ser. No. 07/471,302 filed Jan. 26, 1990); said intake ports lift said lasagne sheets, by virtue of an oscillation of the cross-member 6 about its own pivoting axis, which also acts as fulcrum for a lever 12 which is actuated by a double-action piston 13, and deposit them by gravity onto an underlying conveyor 14, after the slider 3 has been moved away from the tray 11 by the connecting-rod-and-crank unit.

The conveyor 14 is composed of a plurality of pulleys 15 which are keyed on two parallel shafts 16 and 16a which are rotatably mounted on the framework 1 and are mutually connected in pairs, one pulley on the shaft 16 and one on the shaft 16a, by a plurality of belts or wires 17.

A gearmotor unit 18, kinematically connected to one of the two shafts 16, for example by means of a chain 19, actuates the conveyor 14, which transfers the lasagne and unloads them downstream onto a conveyance-orientation unit 20.

Said conveyance-orientation unit 20 comprises two shafts 23 and 23a which are rotatably mounted in a parallel arrangement at the ends of two side walls 22 and 22a. First pulleys 24 having a large median groove 25 are keyed on the shaft 23, whereas second pulleys 26 having a plurality of spaced grooves 26a are keyed on the shaft 23a. Belts or wires 17 are guided in the grooves 26a, and their upper portions are mutually co-planar, diverge starting from a pulley 24 toward the respective pulley 26, and are suitable for conveying the lasagne toward a counting compartment 27.

Each opposite pair of pulleys 24, 26, with its respective belts or wires 17, is longitudinally delimited by containment side walls 28 which, in combination with the non-parallel movement of the belts or wires 17, help to orientate the lasagne along the advancement direction. Indeed, if a sheet lasagne is in an oblique position, or in any case in a position which is different from the one aligned with the side walls 28, the non-parallel motion of the belts 17 causes the sheet of lasagne to collide against one of the side walls 28, so that the lasagne are aligned so as to make them all arrive orientated lengthwise at a counting compartment 27.

Each counting compartment 27 is provided, on its bottom, with a longitudinal slit 29 which has the function of allowing both the passage of a beam emitted by a respective photocell device 30 and the sliding of a respective pusher, as will be explained hereinafter.

The presence of a sheet of lasagne in a compartment 27 causes the interruption of the beam of the photocell, and said photocell sends an impulse to a counting device (not illustrated in the figures) and simultaneously sends an actuation command for the lifting of a barrier 31 which is arranged after each compartment 27 and is actuated by a respective double-action cylinder and piston unit 32, for example a pneumatic one.

Each unit is provided with a stem 33 which is fixed at its end to a bracket 31a which in turn bears two barrier rods or pivots 31 which are slidingly mounted in holes 34a which are provided in a cross-member 34 which belongs to a supporting frame 35.

Once the barriers 31 are lifted, respective pushers 37, which rise from, and can slide along, the slits 29 under the action of jacks 38, for example pneumatic ones, transfer, by pushing, the individual lasagne to a respective stacking compartment 40; the bottom 41 of said stacking compartments is arranged at a lower level with respect to that of the counting compartments 27, so that the lasagne unloaded from the compartments 27 form a stack or pile one above the other.

Once stacking has ended, a barrier 42 arranged after each stacking compartment 40 is raised by a respective jack 43, for example a pneumatic one, which is fully similar to the jacks 32, and appropriate pushers (which are not illustrated in the figures but can be fully similar to the pushers 37), actuated by a respective pneumatic device 44, transfer the stacks of lasagne to an unloading station 45, where photocells 46 check that unloading has occurred.

The conveyance-orientation unit 20 rests, at one of its ends, on a bracket 47 which is actuated by a double-action cylinder and piston unit 48 which abuts on the framework 1, so that the conveyance-orientation unit 20 can be lifted and lowered by rotating about the axis of the motor shaft 23a on which it is pivoted. The shaft 23a is motorized by virtue of the presence of a gearmotor 49.

A control and actuation unit 50, which is pneumatically connected, for example by means of hoses 51 and a manifold 52, to the various actuation devices 32, 43, 38, 44, controls the operation of the apparatus.

The operation of the above described apparatus is as follows: each of the intake ports 8 removes sheet of lasagne from a tray 11 of an appropriate pasta drying oven and deposits it on the conveyor 14 after the slider 3 has moved backward into the release position illustrated in FIG. 1.

The conveyor 14 transfers the lasagne onto the conveyance-orientation unit 20, which aligns them and in turn transfers them to the counting compartments 27.

The photocells 30 detect the possible presence of the lasagne, and if the lasagne are present, the lifting of the barriers 31 and the advancement of the respective pushers 37 are actuated; said pushers send the lasagne to the stacking compartments 41, where they are stacked above one another by gravity.

Once the stack is completed, the barriers 31 arranged after each stacking compartment 27 are raised, and further pushers, actuated by a respective jack 44, transfer the stacks of sheets 43 to the output.

In case of failure or malfunction of the second section of the apparatus, the conveyance-orientation plane 20 is raised by the piston 48 and unloading is performed after the conveyor 14.

In practice, the materials employed, as well as the dimensions, may be various according to the requirements.

The invention described above is susceptible to numerous modifications and variations, all of which are within the protective scope defined by the content of the claims.

Thus, for example, all the servomechanisms of the double-action cylinder-and-piston type can be replaced with similar or equivalent actuation devices, for example electromagnetic ones.

The apparatus according to the present invention, although described with specific reference to lasagne, is furthermore also suitable for the collecting, counting and stacking of products in sheet or panel form or in modular pieces made of any other material.

As can be seen, the apparatus described above can be managed in a fully automatic manner and can operate continuously according to the capacity of the production cycle.

Advantageously, the above described unloading station can be managed in a fully automatic manner and can operate continuously according to the capacity of the production cycle.

The unloading station 45 can in turn comprise a conveyor 60 provided with compartments, which is directed toward an automatic cartoning or packaging machine, for example of a conventional type.

I claim:

1. Apparatus for collecting, counting and stacking sheets of lasagna pasta in output from a pasta drying oven comprising:
a fixed framework (1), two fixed longitudinal lateral guides (2) supported on said framework (1), a slider (3) slideably mounted on said lateral guides (2), a cross member (6) pivotally connected to said slider (3) and extending perpendicular to said lateral guides (2), a manifold (7) connected to said cross member (6), a plurality of intake ports (8) provided on said manifold (7), a suction pump (9) connected to said manifold (7) whereby to apply suction to said intake ports (8) for engaging sheets of lasagna pasta, means (4, 4a, 5, 5a) for actuating said slider (3) whereby to move said slider between a position whereat said intake ports (8) engage sheets of lasagna pasta and a position whereat said intake ports (8) release sheets of lasagna pasta, means (12, 13) for axially oscillating said cross member (6) for lifting sheets of lasagna pasta at said position of said slider (3) whereat said intake ports (8) engage sheets of lasagna pasta, a conveyor (14) underlying said cross member (6) at said position whereat said intake ports (8) release sheets of lasagna pasta, a counting compartment (27), a conveyance-orientation unit (20) for conveying sheets of lasagna pasta from said conveyor (14) to said counting compartment (27), means (29, 30) for detecting the presence of a sheet of lasagna pasta in said counting compartment (27), a stacking compartment (40), and means (37) for transferring a sheet of lasagna pasta from said counting compartment (27) to said stacking compartment (40).

2. Apparatus according to claim 1, wherein said means (4, 4a, 5, 5a) for actuating said slider (3) comprise a frame (5a), a gearmotor (5) supported by said frame (5a), a crank (4a) connected to said gearmotor (5), and a connecting rod (4) connecting said crank (4a) to said slider (3).

3. Apparatus according to claim 1, wherein said manifold (7) is cantilevered to said cross member (6).

4. Apparatus according to claim 1, wherein said means (12, 13) for axially oscillating said cross member (6) comprise a lever (12) and a double-action piston (13), said cross member (6) defining a fulcrum for said lever (12), said double-acting piston (13) being connected to and actuating said lever.

5. Apparatus according to claim 1, wherein said conveyor (14) comprises two shafts (16) rotatably mounted on said framework (1), a plurality of pulleys (15) keyed to each of said two shafts (16), a plurality of belts (17) interconnecting said pulleys (15) on said two shafts (16) in pairs, and a gearmotor unit (18) kinematically connected to one of said two shafts (16) for driving said conveyor (14).

6. Apparatus according to claim 1, wherein said conveyance-orientation unit comprises side walls (22, 22a), parallel shafts (23, 23a) rotatably supported on said side walls (22, 22a), first pulleys (24) keyed to one (23) of said parallel shafts (23, 23a), second pulleys (26) keyed to another one (23a) of said parallel shafts (23, 23a), a median groove (25) formed on each of said first pulleys (24), a plurality of spaced grooves (26a) formed on each of said second pulleys (26), wires (17) guided in said median groove (25) of each of said first pulleys (24) and diverging towards said plurality of spaced grooves (26a) of each of said second pulleys (26).

7. Apparatus according to claim 6, wherein said wires (17) are non-parallel wires (17), and wherein said conveyance orientation unit further comprises containment side walls (28), said non-parallel wires (17) cooperating with said containment side walls (28) for orientating sheets of lasagna pasta with respect to said counting compartment.

8. Apparatus according to claim 1, wherein said means (30) for detecting the presence of a sheet of lasagna pasta in said counting compartment (27) comprise a photocell (30) and a longitudinal slit (29), and where said means (37) for transferring a sheet of lasagna pasta from aid counting compartment (27) to said stacking compartment (40) comprise pusher members (37) and pneumatic jacks (38), said photocell (30) emitting a beam which traverses said longitudinal slit (29), said longitudinal slit (29) accommodating said pusher members (37), said pusher members (37) being activated by said pneumatic jacks (38).

9. Apparatus for collecting, counting and stacking sheets of lasagna pasta in output from a pasta drying oven comprising: a fixed framework (1), two fixed longitudinal lateral guides (2) supported on said framework (1), a slider (3) slideably mounted on said lateral guides (2), a cross member (6) pivotally connected to said slider (3) and extending perpendicular to said lateral guides (2), a manifold (7) connected to said cross member (6), a plurality of intake ports (8) provided on said manifold (7), a suction pump (9) connected to said manifold (7) whereby to apply suction to said intake ports (8) for engaging sheets of lasagna pasta, means (4, 4a, 5, 5a) for actuating said slider (3) whereby to move said slider between a position whereat said intake ports (8) engage sheets of lasagna pasta and a position whereat said intake ports (8) release sheets of lasagna pasta, means (12, 13) for axially oscillating said cross member (6) for lifting sheets of lasagna pasta at said position of said slider (3) whereat said intake ports (8) engage sheets of lasagna pasta, a conveyor (14) underlying said cross member (6) at said position whereat said intake ports (8) release sheets of lasagna pasta, a counting compartment (27), a conveyance-orientation unit (20) for conveying sheets of lasagna pasta from said conveyor (14) to said counting compartment (27), means (29, 30) for detecting the presence of a sheet of lasagna pasta in said counting compartment (27), a stacking compartment (40), and means (37) for transferring a sheet of lasagna pasta from said counting compartment (27) to said stacking compartment;

wherein said conveyance-orientation unit comprises side walls (22, 22a), parallel shafts (23, 23a) rotatably supported on said side walls (22, 22a), first pulleys (24) keyed to one (23) of said parallel shafts (23, 23a), second pulleys (26) keyed to another one (23a) of said parallel shafts (23, 23a), a median groove (25) formed on each of said first pulleys (24), a plurality of spaced grooves (26a) formed on each of said second pulleys (26), wires (17) guided in said median groove (25) of each of said first pulleys (24) and diverging towards said plurality of spaced grooves (26a) of each of said second pulleys (26).

10. Apparatus according to claim 9, wherein said wires (17) are non-parallel wires (17), and wherein said conveyance orientation unit further comprises containment side walls (28), said non-parallel wires (17) cooperating with said containment side walls (28) for orientating sheets of lasagna pasta with respect to said counting compartment.

11. Apparatus according to claim 9, wherein said means (30) for detecting the presence of a sheet of lasagna pasta in said counting compartment (27) comprise a photocell (30) and a longitudinal slit (29), and where said means (37) for transferring a sheet of lasagna pasta from said counting compartment (27) to said stacking compartment (40) comprise pusher members (37) and pneumatic jacks (38), said photocell (30) emitting a beam which traverses said longitudinal slit (29), said longitudinal slit (29) accommodating said pusher members (37), said pusher members (37) being activated by said pneumatic jacks (38).

12. Apparatus according to claim 9, wherein said means (4, 4a, 5, 5a) for actuating said slider (3) comprise a frame (5a), a gearmotor (5) supported by said frame (5a), a crank (4a) connected to said gearmotor (5), and a connecting rod (4) connecting said crank (4a) to said slider (3).

13. Apparatus according to claim 9, wherein said manifold (7) is cantilevered to said cross member (6).

14. Apparatus according to claim 9, wherein said means (12, 13) for axially oscillating said cross member (6) comprise a lever (12) and a double-action piston (13), said cross member (6) defining a fulcrum for said lever (12), said double-acting piston (13) being connected to and actuating said lever.

15. Apparatus according to claim 9, wherein said conveyor (14) comprises two shafts (16) rotatably mounted on said framework (1), a plurality of pulleys (15) keyed to each of said two shafts (16), a plurality of belts (17) interconnecting said pulleys (15) on said two shafts (16) in pairs, and a gearmotor unit (18) kinematically connected to one of said two shafts (16) for driving said conveyor (14).

* * * * *